United States Patent [19]  [11]  4,115,134
Rhodes  [45]  Sep. 19, 1978

[54] TRANSPARENT YTTRIA CERAMICS AND METHOD FOR PRODUCING SAME

[75] Inventor: William H. Rhodes, Lexington, Mass.

[73] Assignee: GTE Laboratories Incorporated, Waltham, Mass.

[21] Appl. No.: 814,341

[22] Filed: Jul. 11, 1977

[51] Int. Cl.$^2$ .............................................. C04B 35/50
[52] U.S. Cl. .................................... 106/73.2; 106/65; 264/65; 423/263; 423/266
[58] Field of Search ................ 106/73.2; 423/266, 263

[56] References Cited

U.S. PATENT DOCUMENTS

| 3,180,741 | 4/1965 | Wainer et al. | 106/73.2 |
| 3,640,887 | 2/1972 | Anderson | 106/73.2 |

FOREIGN PATENT DOCUMENTS 2,056,763  5/1971  Fed. Rep. of Germany .......... 106/73.2

OTHER PUBLICATIONS

Berndt, U. et al., "New A$^{III}$B$^{III}$O$_3$ Interwanthanide Perovskite Compounds," J. of Solid State Chemistry 13, No. 1-2, Feb. 1975, pp. 131-135.

*Primary Examiner*—Helen M. McCarthy
*Attorney, Agent, or Firm*—David M. Keay

[57] ABSTRACT

An article of manufacture is provided comprising a substantially transparent high density polycrystalline yttriabase body consisting essentially of yttria and from about 6 to 14 mole percent lanthana.

A method for preparing the transparent yttria doped with lanthana is also provided comprising admixing or co-precipitating lanthana or a precursor thereof with yttria or a precursor thereof, washing, drying and screening the mixture, calcining the admixed or co-precipitated powders, pressing the calcined powders into a desired shape and thereafter sintering the shaped powder for from about 1/6 to 6 hours at a temperature above the H-phase transition and for from about ½ to 6 hours at a temperature below the H to C phase transition, said sintering being effected at a sufficiently low oxygen atmosphere to prevent oxidative contaminants.

2 Claims, No Drawings

TRANSPARENT YTTRIA CERAMICS AND METHOD FOR PRODUCING SAME

BACKGROUND OF THE INVENTION

The present invention relates to transparent yttria ceramics and to methods for the preparation thereof. More particularly, this invention relates to substantially transparent, high density, polycrystalline yttria doped with lanthana and to methods for the preparation thereof.

Ceramics have long been considered desirable materials for use in high temperature applications; however, ceramic materials are generally opaque and cannot be suitably employed where light transmission is desired.

Efforts have heretofore been made to obtain transparent ceramics especially for high temperature lamp envelope applications. Recently, transparent yttria-based materials have been developed. For example, U.S. Pat. No. 3,545,987 discloses a high density, yttria-based polycrystalline ceramic containing from about 2 to 15 mole % of an oxide selected from the group consisting of thoria, zirconia, hafnia or combinations thereof. It has been found, however, that in such materials anion interstitials are formed which are unstable in the low-oxygen pressure, high temperature environment of a high-pressure sodium lamp. Consequently, high-pressure sodium lamps having envelopes formed from such materials have been found to be unsatisfactory since they darken rendering the envelope opaque after a few hours of use.

U.S. Pat. No. 3,878,280 describes a method for the preparation of transparent yttria without the use of additives by use of a vacuum hot pressing operation. This technique is not amenable, however, to the production of thin-wall lamp envelope tubing due to the high-pressure gradients along the length of the tube. Consequently, hot pressing is not currently considered a viable process for the formation of transparent polycrystalline tubes.

U.S. Pat. No. 3,873,657 describes the preparation of transparent yttria by employing beryllium compounds as a sintering aid. The beryllium compounds employed, however, are toxic; consequently, utilization of such materials in commercial manufacturing operations would be severely handicapped and even perhaps prevented by governmental regulations.

SUMMARY OF THE INVENTION

Accordingly, it is an object of the present invention to overcome the disadvantages of the prior art and to provide a substantially transparent yttrium oxide with excellent light transmitting properties. It is another object to provide a method for economically and non-toxically fabricating such transparent yttria envelopes which are stable in the environment of a high-pressure sodium lamp.

These as well as other objects are accomplished by the present invention which, in one embodiment, provides an article of manufacture comprising a substantially transparent, high density, polycrystalline yttria-based body consisting essentially of yttria ($Y_2O_3$) and containing from about 6 to 14 mole percent lanthana ($La_2O_3$).

The present invention makes use of the increased thermodynamic stability of yttria ($Y_2O_3$) over yttria doped with +4 valence ions, e.g. $Th^{+4}$. Yttria, when doped with thoria, darkens between 1200°–1400° C in the sodium vapor environment (an oxygen pressure of $10^{-7}$ atmospheres). It has now been found that if lanthana ($La_2O_3$) is employed as a sintering aid, yttria can be sintered to transparency without significantly reducing the thermodynamic stability of yttria.

The addition of $La_2O_3$ has two effects; a minor concentration of B-phase (monoclinic) forms in addition to the major matrix C-phase (cubic) at high temperature, and at still higher temperatures the B-phase plus additional C-phase converts to the H-phase (hexagonal). The H-phase is effective in retarding grain growth thereby allowing sintering to proceed until a low porosity high transparency body is achieved. The temperature is lowered from the upper sintering temperature to a temperature where the H-phase reconverts to C-phase and perhaps some B-phase. It is believed that the latter phase transition is accompanied by grain growth during which additional porosity is removed. The low temperature sintering step also substantially reduces the non-C-phase content which enhances the transparency. $La_2O_3$ has the further advantage that it is a stable +3 valence ion which does not create point defects when substituted in the $Y_2O_3$ lattice. Consequently, the inherent thermodynamic stability of $Y_2O_3$ is not seriously degraded.

The transparent yttria doped with lanthana in accordance with the present invention can be obtained by combining lanthana with yttria in a concentration of from about 6 to 14 mole percent and preferably from about 8 to about 11 mole percent.

In one way of combining lanthana with yttria, oxides of both elements are dissolved in $HNO_3$ and co-precipitated with either $H_2C_2O_4$ or $(NH_4)_2C_2O_4$. Thereafter, the resulting powders are washed, dried and screened and thereafter calcined for 1 hour at about 1000° C in air. The resulting powders are then pressed in either a tube or disc shape at 15–50,000 psi. The pressed article is prefired in air for 1 hour at about 1000° C, and is then transferred to a controlled atmosphere furnace, and sintered by a schedule consisting of 1/6 to 6 hours above the H-phase transition, preferably 2150° C and ½ to 6 hours below the H-to C-phase transition, preferably 1900° C. Both the C- to B- and B-to H-phase transitions are temperature and composition dependent, thus each composition is expected to have an optimum sintering and annealing temperature. The atmosphere during sintering should be at a low enough oxygen pressure, $P_{O_2}$, to prevent oxidation of the furnace element which can contaminate the sintered body. In the case of a W mesh furnace a $P_{O_2} \leq 10^{-10}$ atm. at 1900° C and $2 \times 10^{-10}$ atm. at 2150° C is satisfactory. If $P_{O_2}$ of $1 \times 10^{-10}$ is employed during the 1900° C sintering the resultant product is colorless $Y_2O_3$. If the $P_{O_2}$ is $<<10^{-10}$ atm. the resultant product is black, but it can be easily oxidized in 5 hours at 1500° C in air.

The substantially transparent, high-density polycrystalline yttria doped with lanthana obtained in accordance with the present invention provides an excellent shaped transparent ceramic for lamp envelope applications. These ceramics are thermodynamically more stable than yttria doped with +4 valence ions in a sodium lamp environment. The transparent ceramics of the present invention can be easily pressed and sintered forming transparent tubes and other complicated shapes. Moreover, the lanthana sintering aid of the present invention is non-toxic.

DESCRIPTION OF PREFERRED EMBODIMENTS

The following examples further illustrate the present invention. It is to be understood that these examples are for illustrative purposes only and neither the spirit nor scope of this invention is to be limited thereby. Unless otherwise specified, all percentages and parts are by weight.

In the following examples density measurements were based on the Archimedes principle and performed on a Mettler analytical balance. Optical measurements on polished 1 millimeter thick disc specimens were obtained on a Cary 14 spectrophotometer. All reported values are at a wavelength of 0.6 micrometers. Total transmission of tubes was measured with a Hoffman Engineering Corp. 12 inch integrating sphere in the visible wavelength range. Specular transmissions on tubes was taken with a GTE Sylvania device which measures light transmission through both walls along a specimen diameter.

The table below summarizes the results obtained:

While there has been shown and described what is at present considered the preferred embodiment(s) of the invention, it will be obvious to those skilled in the art that various changes and modifications may be made therein without departing from the scope of the invention as defined by the appended claims.

For example, instead of dissolving the oxides of yttria and lanthana and co-precipitating to obtain the solid solution, yttria and lanthana or precursors of these compounds can be admixed by blending the dry powders. The solid solution would be formed in this case during the calcining step where solid state diffusion would effect this intimate solution.

What is claimed is:

1. An article of manufacture comprising a substantially transparent, high density polycrystalline yttria-based body which is thermodynamically more stable in the environment of a high-pressure sodium vapor lamp than yttria doped with +4 valence ions, consisting essentially of yttria and from about 6 to 14 mole percent lanthana.

2. An article of manufacture as defined in claim 1 containing from about 8 to 11 mole percent lanthana.

* * * * *

TABLE

| Ex. | Mole % $La_2O_3$ | Source of $La_2O_3$ | Source of $Y_2O_3$ | Sample Shape | Pressing Process (Ksi) | Sintering Cycle | Estimated % Theoretical Density | % Total* Transmittance | % Specular** Transmittance |
|---|---|---|---|---|---|---|---|---|---|
| 1. | 8.0 | $La_2(C_2O_4)_3$ | $Y_2(C_2O_4)_3$ | disc | 50 | 2100° C-2¼ h 1900° C-1 h | 99.3 | 74 | 60 |
| 2. | 12.0 | $La_2(C_2O_4)_3$ | $Y_2(C_2O_4)_3$ | disc | 50 | 2100° C-2¼ h 1900° C-1 h | 99.4 | 54 | 0.5 |
| 3. | 8.0 | $La_2(C_2O_4)_3$ | $Y_2(C_2O_4)_3$ | tube | 28 | 2100° C-2¼ h 1900° C-1 h | 99.4 | 82 | — |
| 4. | 10.0 | $La_2(C_2O_4)_3$ | $Y_2(C_2O_4)_3$ | disc | 50 | 2150° C-2¼ h 1900° C-1 h | 99.2 | 86 | 58 |
| 5. | 11.0 | $La_2(C_2O_4)_3$ | $Y_2(C_2O_4)_3$ | disc | 50 | 2150° C-3 h 1900° C-3 h | 99.1 | 77 | 65 |
| 6. | 10.0 | $La_2(CO_3)_3$ | $Y_2(CO_3)_3$ | disc | 50 | 2150° C-3 h 1900° C-6 h | 98.8 | — | — |
| 7. | 10.0 | $La_2(C_2O_4)_3$ | $Y_2(C_2O_4)_3$ | tube | 28 | 2150° C-3 h 1900° C-2 h | 99.1 | 90 | 2.2 |
| 8. | 10.0 | $La(C_7H_{15}COO)_3$ | $Y(C_7H_{15}COO)_3$ | disc | 50 | 2150° C-3 h 1900° C-2 h | 90.0 | — | — |
| 9. | 10.0 | $La_2(C_2O_4)_3$ | $Y_2(C_2O_4)_3$ | disc | 50 | 2150° C-3 h 1900° C-2 h | 99.5 | 82.5 | 78.2 |

*Reflected losses reduce theoretical transmittance to approximately 86% (81.3% for pure $Y_2O_3$).
**Pseudo specular transmission of tubes was along diameter and through two walls.